March 16, 1965 W. L. DEEG 3,174,009

MOUNTING MEANS FOR MAGNETIC MEMORY SEALED REED SWITCH UNIT

Filed Dec. 14, 1962 2 Sheets-Sheet 1

INVENTOR.
WYMAN L. DEEG
BY
Mason, Kolehmainen, Rathburn and Wyss
ATTORNEYS.

MOUNTING MEANS FOR MAGNETIC MEMORY SEALED REED SWITCH UNIT

Filed Dec. 14, 1962

INVENTOR.
WYMAN L. DEEG
BY
Mason, Kolehmainen, Rathburn and Wyss
ATTORNEYS.

United States Patent Office 3,174,009

Patented Mar. 16, 1965

3,174,009

MOUNTING MEANS FOR MAGNETIC MEMORY SEALED REED SWITCH UNIT

Wyman L. Deeg, Glenview, Ill., assignor to C. P. Clare & Company, Chicago, Ill., a corporation of Delaware Filed Dec. 14, 1962, Ser. No. 244,769
4 Claims. (Cl. 200—87)

This invention relates to a switching assembly and, more particularly, to a magnetic memory unit using a plurality of sealed magnetic switches.

Data storing circuits form a part of most data handling or communication systems, and these storage circuits generally can be placed in one of two categories. In a first group, the quantity of data to be stored in bit form is so large that the design of the unit is directed toward reducing the physical size of the bit storage element and the bit storage and retrieval time to a minimum. These circuits commonly use such expedients as semiconductor devices or magnetic members with high packing density. Although the cost of these storage units is rather large, the storage cost per bit can be relatively low because of the large storage capacity of the unit. This type of unit, however, has the disadvantage that it is not capable of handling adequate current levels or of providing sufficient circuit isolation for some applications, and the components used frequently do not possess an adequate operating life.

In a second general group of storage units, data is stored in the form of opened and closed contacts, either mechanically or electromechanically actuated. The mounting space, contact life, and power consumption difficulties of the telephone type relay commonly used in this type of storage unit have been obviated to a marked degree by the use of sealed magnetic switches that retain the desirable load carrying capabilities and circuit isolation characteristics of the telephone relay. However, since it is necessary to provide one sealed switch for each stored bit, the mounting and operating means for the individual switches as well as any common electrical control means must be as simple as possible in order to reduce the storage cost per bit.

Accordingly, one object of this invention is to provide a new and improved switching assembly including a plurality of sealed magnetic switches.

Another object is to provide an easily constructed magnetic storage unit using sealed magnetic switches.

Another object is to provide a magnetic memory unit including new and improved means for mounting a plurality of sealed switches and the operating windings therefor.

Another object is to provide a magnetic memory unit including means for selectively operating a plurality of sealed switches with coordinately arranged windings.

A further object is to provide a magnetic data storage unit including capacitive means for entering data in and clearing data from a plurality of coordinately arranged sealed magnetic switches.

In accordance with these and many other objects, an embodiment of the invention comprises a magnetic data storage unit using a plurality of individual sealed magnetic switch units. Each of the switch units comprises an elongated dielectric housing from the opposite ends of which the terminal portions of a pair of magnetic elements extend. The inner ends of the magnetic elements are normally maintained in an overlapping and spaced relation and are adapted to be moved into engagement to complete a conductive circuit through the switch in response to an applied magnetic field of a given strength. An annular permanent magnet is mounted on the elongated housing substantially midway along its length to encircle the overlapping portions of the magnetic elements. This permanent magnet provides a field which is not sufficient to move the magnetic elements into engagement but which is capable of retaining the magnetic elements in engagement after they have been moved to this position. Each of the sealed switches is provided with two self-supporting coils which are mounted on opposite ends of the elongated housing and which are each provided with two leads extending parallel to but spaced from the terminal portions of the magnetic elements at the opposite ends of the elongated housing.

The plurality of sealed switches are mounted on a supporting frame comprising a plate of magnetic shielding material to the opposite sides or edges at which two dielectric wall elements are mounted in spaced parallel relation. The upper edges of the dielectric wall elements are provided with aligned recesses in which the terminals of the magnetic elements and the leads of the operating windings or coils are mounted. The surfaces of the dielectric wall elements are provided with printed circuit patterns for extending connections to the terminals of the magnetic switches and the leads of the coil. A plurality of magnetic shields carried on the supporting frame are interposed between adjacent switches to prevent magnetic interaction therebetween.

In one form of the magnetic memory unit, the two self-supporting coils on the sealed switch units are connected into a conventional two coordinate matrix circuit having one set of row input terminals and one set of column input terminals. The magnetic storage control circuit includes normally charged capacitive means that are selectively connected to the row and column input terminals in accordance with the designation of the sealed magnetic switch unit that is to be operated to store each desired data bit. A bistable circuit that is connected in common to all of the windings in the matrix is placed in a conductive state after the input information has been supplied to the row and column input terminals to connect all of the windings to a reference potential. This permits the normally charged capacitive means to discharge through the selected windings so that the first and second windings on the desired sealed switch are concurrently energized to apply a resultant flux field of a magnitude sufficient to move the magnetic elements in the desired switch into engagement, thereby completing a conductive circuit through the switch as an indication that the desired bit has been stored. The termination of the current flow through the winding when the capacitive means is discharged does not permit the operated switch to release because the annular bias magnet carried on the switch provides a field sufficient to hold the engaged magnetic elements in a closed circuit condition.

When the magnetic storage unit is to be restored to a normal condition, a capacitive means is discharged in a reverse direction through at least one of the first or second winding means on all of the sealed switches. The field induced in the magnetic elements in each of the sealed switches by this reverse flow of current produces a flux field opposing that of the bias magnets and permits any operated ones of the sealed switch units to be released.

Many other objects and advantages of the present invention will become apparent from considering the following detailed description in conjunction with the drawings in which.

Figure 5:
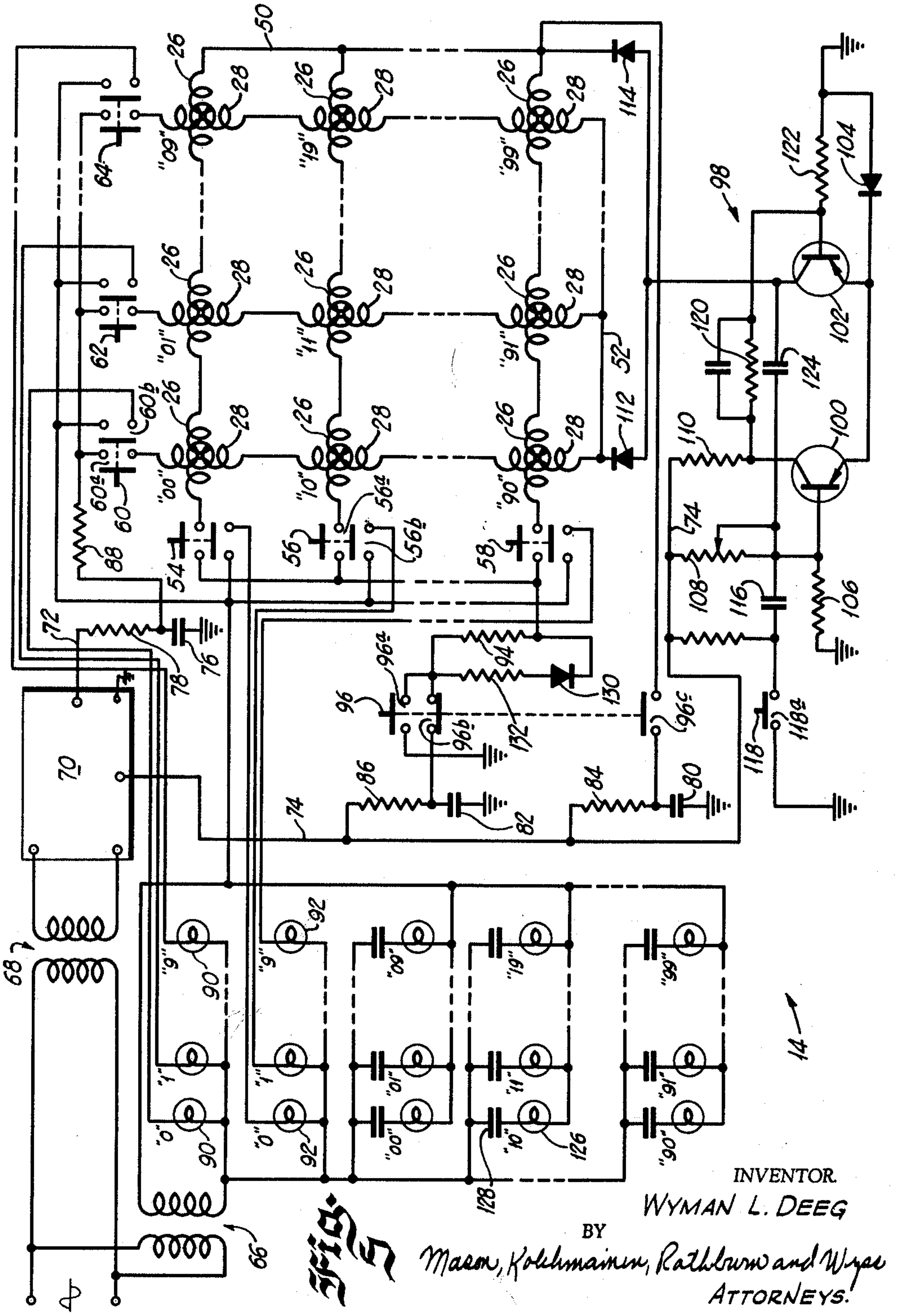
FIG. 5 is a schematic circuit diagram of the magnetic data storage unit.

FIGURES 1–4 of the drawings illustrate a switching assembly indicated generally as 10 which includes means for supporting and extending electrical connections to a plurality of sealed magnetic switch units 12 that provide the incremental bit storage elements used in a magnetic storage unit 14 shown schematically in FIG. 5. A plurality of the sealed switches 12 together with the biasing and operating means therefor are mounted on a supporting means or frame indicated generally as 16 to provide a storage or switching module that can be detachably connected to the common control circuits provided in the storage unit 14. The use of the modular switching assemblies 10 permits the replacement of the bit storage units in the magnetic storage means 14 and facilitates changing the storage capacity thereof.

Figures 1, 2, 3, 4:
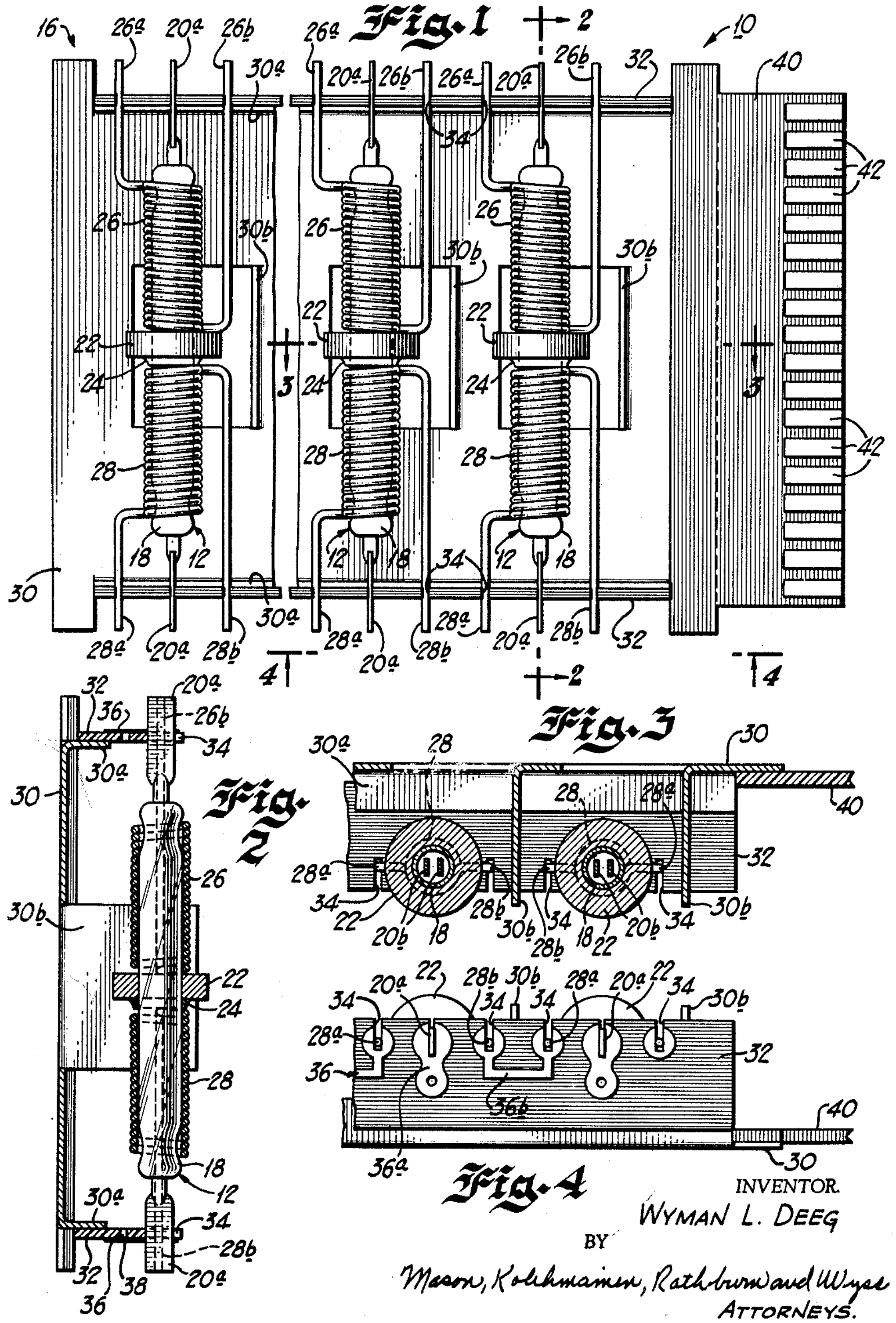
FIG. 1 is a fragmentary plan view of a magnetic data storage unit embodying the present invention.
FIG. 2 is a sectional view taken along line 2—2 in FIG. 1.
FIG. 3 is a sectional view taken along line 3—3 in FIG. 1.
FIG. 4 is an elevational view looking in the direction of the arrows 4—4 in FIG. 1.

Referring now more specifically to FIGS. 1–4 of the drawings, each of the sealed switches 12 comprises an elongated dielectric envelope 18 containing a pair of magnetic elements 20 with flattened outer end or terminal portions **20*a* and overlapping inner end portions 20*b* (FIG. 3). The inner end portions 20*b* are normally maintained spaced from each other and are moved into engagement by an applied flux field of a given strength. Once the elements 20 have been moved into engagement, they can be retained in engagement by an applied flux field of a strength less than the given strength. This holding flux is provided by an annular permanent magnet 22 that is secured in a position substantially midway along the length of the elongated housing 18 in a position adjacent or encircling the overlapping portions 20*b* of the magnetic elements 20 by any suitable means, such as a mass of dielectric cement 24 (FIG. 2). Although the switching means 12** is illustrated as comprising a dry contact magnetic reed switch, any other suitable sealed magnetic switch of the types well known in the art can be used.

The operating means for each of the sealed switches 12 comprises a pair of self-supporting coils 26 and 28 which are formed of heavy gauge enameled wire on a spring winding machine. The windings or coils 26 and 28 are provided with an internal diameter approximately the outer diameter of the dielectric envelope 18 and are slidably mounted on the opposite ends of the housing 18 at opposite sides of the biasing magnet 22, the coil 28 being spaced from the magnet 22 by the dielectric cement 24 to prevent any possible direct connection between the coils 26 and 28. Each of these two coils is provided with two relatively rigid leads **26*a*, 26*b* and 28*a*, 28*b*. The leads 26*a*, 26*b* and 28*a*, 28*b* extend generally parallel to the terminal portions 20*a* of the magnetic elements 20 and lie within a plane passing transversely through the flattened portions 20*a*** of these magnetic elements.

The supporting structure 16 includes a baseplate 30 of magnetic shielding material having a pair of flanges **30*a* formed along its opposite edges to which two dielectric wall elements 32 are secured. The outer or upper edge of each of the dielectric elements 32 is provided with a plurality of spaced notches or slots 34 aligned with the corresponding slots in the other dielectric element 32. One or both of the surfaces of each dielectric element 32 is provided with a printed circuit pattern consisting of segments of electrically conductive material 36 (FIG. 4) which include portions surrounding at least portions of the slots 34. When the sealed switches 12 are to be assembled on the supporting structure 16, the leads 26*a*, 26*b* and 28*a*, 28*b* and the terminal portions 20*a* of the magnetic elements 20 are inserted into the aligned slots 34 in the dielectric members 32, and these leads and terminals are connected to the adjacent conductive segments 36 of the printed circuit pattern, as by soldering. Thus, the windings 26 and 28, the sealed switches 12, and the bias magnets 22 can be secured in predetermined positions on the supporting structure 16** and electrically connected thereto in a single operation.

In the printed circuit pattern shown in FIG. 4, each of the terminals **20*a* is connected to a conductive segment 36*a* having a depending lower portion with a centrally disposed aperture 38. The aperture 38 can be used to receive suitable conductor means to extend external connections to the sealed switch 12. The printed circuit pattern also includes a plurality of segments 36*b* extending between adjacent slots 34 for connecting the leads 26*a*, 26*b* and 28*a*, 28*b* of the coils 26 and 28 on adjacent ones of the sealed switches 12. The conductive segments 36 of the printed circuit pattern can have any other desired configuration in dependence upon the external circuitry with which the sealed switches 12 are to be used. A male connector including a dielectric panel 40 having a plurality of conductive segments 42 is secured to one end of the baseplate 30 and is interconnected with the printed circuit pattern formed on the dielectric elements 32 in any suitable manner to provide means for extending external connections from the switching assembly 10**.

To prevent interaction between adjacent switches 12 and the permanent magnets 22 thereon, a plurality of lugs or shielding elements **30*b* are struck out of the baseplate 30 to project upwardly between the adjacent switch units 12. The lugs 30*b* extend generally parallel to the elongated switch units 12 and prevent the field of one bias magnet 22 from affecting the operation of the adjacent switches. If desired, separate shielding elements can be secured to the upper surface of the baseplate 30 rather than being stamped from the plate 30**.

The switching assemblies 10 are used to provide a 10 x 10 memory matrix in the magnetic storage unit 14 illustrated in FIGURE 5 of the drawings which includes one hundred of the magnetic sealed switch units 12. The windings 26 and 28 on the sealed switches 12 are connected in a conventional two coordinate matrix circuit with the windings 26 connected in rows and the windings 28 connected in columns. The windings 26 are connected into ten series circuits of ten windings each representing the ten rows, and the ten series circuits are connected at one end to a common row conductor 50. The windings 28 are connected in ten series circuits of ten windings each representing the ten columns, and one terminal of each of the ten series circuits is connected to a common column conductor 52. The other ten terminals of the row circuits and of the column circuits are adapted to receive row and column input information.

In the circuit shown in FIG. 5, the row information is provided by ten manually actuated row input switches of which only three switches 54, 56 and 58 representing the row input digits "0," "1" and "9" are illustrated. Similarly, the ten column input terminals to the windings 28 are provided with ten manually actuated column input switches of which only three switches 60, 62 and 64 representing the column input digits "0," "1" and "9" are illustrated.

The magnetic data storage unit 14 is energized from a source of conventional alternating current voltage which is coupled through a transformer 66 to provide an energy source for illuminating a group of indicator lamps providing visual representations of input and output information. A transformer 68 applies the input voltage to a direct current power source 70 that can comprise any well known rectifying network, such as a fullwave rectifier circuit. The negative direct current output potential from the power source 70 is applied to a pair of conductors 72 and 74. The potential supplied to the conductor 72 charges a capacitor 76 through a series resistor 78, and the potential applied to the conductor 74 maintains a pair of capacitors 80 and 82 in a normally charged condition through a pair of resistance elements 84 and 86, respectively.

When a selected data item, such as the entry "10," is to be entered into or stored in the storage unit 14, the row "1" representing switch 56 and the column "0" representing switch 60 are operated. The operation of the switch 60 closes two pairs of contacts 60*a* and 60*b*. The closure of the contacts 60*a* connects the ten windings 28 in the "0" column of the matrix to the normally charged capacitor 76 through a current limiting resistor 88, and the closure of the contacts 60*b* connects a column "0" representing lamp 90 in a bank thereof across the secondary winding of the transformer 66 so that this lamp is illuminated to provide an indication that the column digit "0" has been entered. When the switch 56 is operated to close two pairs of contacts 56*a* and 58*b* representing the row digit "1," the closure of the contacts 56*b* connects a row digit "1" lamp 92 in a bank thereof across the secondary winding of the transformer 66 to illuminate this lamp as an indication that the row "1" switch 56 has been actuated. The closure of the contacts 56*a* connects the ten windings 26 in row "1" of the matrix to the normally charged capacitor 82 through a current limiting resistor 94 and a normally closed pair of contacts 96*b* on an erase switch 96. Thus, the matrix circuit is prepared for the entry of "10" by the connection of the winding 26 on the "10" representing switch 12 to the capacitor 82 and the connection of the winding 28 on this switch to the normally charged capacitor 76.

The actual entry of the information into the matrix circuit of the magnetic storage unit 14 is controlled by a monostable circuit indicated generally as 98 which includes a pair of transistors 100 and 102. The emitter electrodes of both of the transistors 100 and 102 are connected to ground through a diode 104, and the base electrode of the transistor 100 is biased to a point more negative than its emitter electrode by a voltage dividing network including a resistance element 106 and a potentiometer 108 connected in series between ground and the direct current potential conductor 74. Thus, the transistor 100 is normally in a conducting condition so that substantially all of the potential applied to the conductor 74 is dropped across a collector resistor 110, and the base electrode of the transistor 102 is held at a potential that is positive relative to its emitter potential. Accordingly, the transistor 102 is normally in a nonconductive state. The collector electrode of the transistor 102 is provided with a negative operating potential from the charged capacitors 76 or 82 as soon as any of the input switches to the matrix are closed over paths including a pair of isolating diodes 112 and 114 connected to the conductors 52 and 50, respectively. In the normal condition of the monostable circuit 98, a capacitor 116 is charged to substantially the full potential applied to the conductor 74.

After the input switches to the matrix have been operated to select the desired entry and the storage of this entry in the matrix is to be made, a manually operated switch 118 is momentarily actuated to close a pair of contacts 118*a*. This grounds one terminal of the capacitor 116 so that a more positive potential is applied to the base electrode of the transistor 100. This places this transistor in a nonconductive condition so that the voltage dividing network including the resistor 110 and a pair of additional resistors 120 and 122 places a more negative bias on the base electrode of the transistor 102, thereby biasing this base negative with respect to its emitter electrode. This places the transistor 102 in a conductive condition so that the two capacitors 76 and 82 discharge through the "0" column windings 28 and the "1" row windings 26. When the transistor 102 is placed in conduction, a capacitor 124 applies a positive-going pulse to the base electrode of the transistor 100 to hold this transistor in its nonconductive state. When the capacitors 116 and 124 have discharged sufficiently, the voltage dividing network including the resistor 106 and the potentiometer 108 returns to the base electrode of the transistor 100 to a potential more negative than its emitter electrode, and this transistor returns to a conductive condition. This drives the base electrode of the transistor 102 more positive than its emitter to terminate its period of conduction. In one magnetic storage unit 14 constructed in accordance with the present invention, the monostable circuit 98 provides an "on" time for the transistor 102 of approximately 1.5 milliseconds.

When the capacitors 76 and 82 discharge through the two windings 26 and 28 of the "10" representing sealed switch 12, the flux generated in the magnetic elements 20 of this switch by the energized windings 26 and 28 and the flux supplied by the biasing magnet 22 move the overlapping portions 20*b* into engagement to complete a conductive circuit through the "10" representing switch 12. The overlapping portions 20*b* of the elements 20 do not move out of engagement when the discharge current from the capacitors 76 and 82 is terminated because of the holding flux provided by the permanent magnet 22. Thus, the entry "10" has now been magnetically stored by the closed contacts of the selected switch 12 in the matrix. Although the contacts of the sealed switches 12 in the matrix can be used to provide any desired control operation or function, these switches are shown as controlling the selective illumination of a bank of lamps 126 that provide visual indications of the data stored in the matrix circuit. The magnetic reeds or elements 20 of the sealed switch 12 representing the entry "10" are shown schematically as a pair of normally open contacts 128 in FIGURE 5. When operated, the contacts connect the "10" representing lamp 126 across the secondary winding of the transformer 66 to illuminate this lamp.

After the selected data bit has been stored by closing the "10" representing switch 12, the previously actuated, locking type switches 56 and 60 are released. Addtional entries can now be stored in the unit by selectively operating different ones of the input switches followed by the actuation of the switch 118. The current flow through the windings 26 and 28 during the storage of the subsequent entries in the matrix does not cause the release of the "10" representing sealed switch 12 because the polarity of the flux generated by the windings 26 and 28 is the same as that provided by the bias magnets 22.

When the matrix circuit is to be restored to a normal condition by releasing any operated ones of the sealed switch units 12, row switches, such as the switch 56, associated with a row in which there is at least one operated switch are closed, and the erase switch 96 is momentarily closed to open the contacts 96*b* and to close a plurality of contacts 96*a* and 96*c*. The opening of the contacts 96*b* disconnects the storage capacitor 82 from the row input switches, and the concurrent closure of the contacts 96*a* connects those of the rows of windings 26 in which the row input switch is closed to ground through the resistance element 94 and a parallel branch including a diode 130 and a resistor 132. The closure of the contacts 96*c* connects the normally charged storage capacitor 80 to the common conductor 50 that is connected to one end of all of the series circuits including the row windings 26.

The closure of the contacts 96*c* permits the capacitor 80 to discharge through all of the previously selected rows of windings 26 associated with operated sealed switch units over a circuit including the operated ones of the switches 54, 56, and 58, the parallel circuit including the resistors 94 and 132 and the diode 130, and the closed contacts 96*a*. Since the flow of discharge current through the windings 26 is opposite to that used to operate the switches 12, the generated flux fields are of polarities opposite to those provided by the bias magnets 22. Thus, the resultant flux fields in the magnetic elements 20 of the sealed switches 12 drop below the value necessary to hold the previously operated switches in a closed condition, and these switches are released to restore the matrix to a normal condition. When the erase switch 96 is released to open the contacts 96*a* and 96*c* and to close the contacts 96*b*, the capacitor 82 is again connected to the row input terminals of the matrix. Any operated ones of the row input switches, such as the switches 54, 56, and 58, are then released to restore the data storage circuit 14 to a normal condition.

The magnetic data storage unit 14 is shown as including the manually actuated switches 96 and 18 for initiating the erasing and recording operations and as including the manually actuated switches 54, 56, 58, 60, 62 and 64 for supplying row and column input information to the matrix. However, these components have been used to simplify the illustration of the unit 14. In application, the row and column inputs, for instance, can be supplied by controlled conduction devices, such as semiconductor devices, controlled by data input sources. Similarly, the data storage and erasing functions can be initiated by any number of suitable well known control circuits. In addition, the sealed switches 12 in the storage unit 14 control the establishment of a visible display by the lamps 126, but the stored data made available by these switches can be used to perform any number of different functions, such as data translation or switching path selection.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States of America is:

1. A switching assembly comprising a plurality of sealed switch units each having an elongated dielectric housing and a pair of terminals projecting from the opposite ends of the housing, a plurality of pairs of self-supporting coils, each of said coils having a pair of spaced and generally parallel leads, each pair of coils being slidably mounted on opposite ends of the elongated housing of one of the switch units with the leads disposed on opposite sides of and extending generally parallel to one of the terminals of the switch unit, and a supporting frame having a pair of spaced and parallel dielectric portions, each of said dielectric portions having a plurality of spaced recesses in its upper edge, said sealed switch units being disposed between and supported on said dielectric portions with the terminals and leads at one end of the switches being mounted in the recesses in one of the dielectric portions and with the terminals and leads at the other end of the switch units mounted in the recesses in the other dielectric portion.

2. A magnetic memory unit comprising a plurality of sealed switch units each having an elongated dielectric housing and a pair of terminals projecting from the opposite ends of the housing, an annular permanent magnet encircling the housing substantially midway along its axial length, a plurality of pairs of self-supporting coils, each of said coils having a pair of spaced and generally parallel leads, each pair of coils being slidably mounted on opposite ends of the elongated housing of one of the switch units with the leads disposed on opposite sides of and extending generally parallel to one of the terminals of the switch unit, and a supporting frame having a pair of spaced and parallel dielectric portions, each of said dielectric portions having a plurality of spaced recesses in its upper edge, said sealed switch units being mounted between said dielectric portions with the terminals and leads at one end of the switch units being mounted in the recesses in one of the dielectric portions and with the terminals and leads at the other end of the switch units mounted in the recesses in the other dielectric portion.

3. A magnetic memory unit comprising a plurality of sealed switch units each having an elongated dielectric housing and a pair of terminals projecting from the opposite ends of the housing, a permanent magnet secured to the housing substantially midway along its axial length, a plurality of pairs of self-supporting coils, each of said coils having a pair of spaced and generally parallel leads, each pair of coils being slidably mounted on opposite ends of the elongated housing of one of the switch units with the leads disposed on opposite sides of and extending generally parallel to one of the terminals of the switch unit, a supporting frame of magnetic shielding material having a plurality of spaced projections, a pair of spaced and parallel dielectric members secured along opposite edge portions of the frame, each of said dielectric members having a plurality of spaced recesses in its upper edge, each of said sealed switch units being mounted between adjacent ones of the spaced projections and extending transverse to the dielectric members, the terminals and leads at one end of the switch units being mounted in the recesses in one of the dielectric members and with the terminals and leads at the other end of the switch units mounted in the recesses in the other dielectric member.

4. A magnetic memory unit comprising a plurality of sealed switch units each having an elongated dielectric housing and a pair of terminals projecting from the opposite ends of the housing, an annular permanent magnet encircling the housing substantially midway along its axial length, a plurality of pairs of self-supporting coils, each of said coils having a pair of spaced and generally parallel leads, each pair of coils being slidably mounted on opposite ends of the elongated housing of one of the switch units with the leads disposed on opposite sides of and extending generally parallel to one of the terminals of the switch unit, and a supporting frame formed of magnetic shielding material and having a pair of spaced and parallel dielectric portions projecting outwardly from one side of the supporting frame, each of said dielectric portions having a plurality of spaced recesses in its upper edge, said sealed switch units being mounted between said dielectric portions with the terminals and leads at one end of the switch units being mounted in the recesses in one of the dielectric portions and with the terminals and leads at the other end of the switch units mounted in the recesses in the other dielectric portion, and a plurality of elements of magnetic shielding material carried on the supporting frame and each disposed between adjacent ones of the permanent magnets.

References Cited by the Examiner

UNITED STATES PATENTS

| | | | |
|---|---|---|---|
| 2,929,895 | 3/60 | Shebanow | 200—87 |
| 3,002,067 | 9/61 | Baldwin | 200—87 |
| 3,061,696 | 10/62 | Peek | 200—87 |
| 3,079,588 | 2/63 | Burstow | 340—166 |
| 3,093,813 | 6/63 | Gerbig | 340—166 |
| 3,114,080 | 12/63 | Koda et al. | 200—87 |

OTHER REFERENCES

"Multiple Reed Switch," IBM Technican Disclosure Bulletin, volume 4, No. 7, dated December 1961.

BERNARD A. GILHEANY, *Primary Examiner.*

IRVING L. SHRAGOW, ROBERT K. SCHAEFER, *Examiners.*